United States Patent
Lee et al.

(10) Patent No.: US 11,086,722 B2
(45) Date of Patent: Aug. 10, 2021

(54) MEMORY SYSTEM AND OPERATING METHOD THEREOF

(71) Applicant: SK hynix Inc., Gyeonggi-do (KR)

(72) Inventors: Joo Young Lee, Seoul (KR); Hoe Seung Jung, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 57 days.

(21) Appl. No.: 16/144,088

(22) Filed: Sep. 27, 2018

(65) Prior Publication Data
US 2019/0272217 A1    Sep. 5, 2019

(30) Foreign Application Priority Data
Mar. 2, 2018    (KR) .................. 10-2018-0025316

(51) Int. Cl.
*G06F 13/14*    (2006.01)
*G06F 11/14*    (2006.01)
*G06F 3/06*    (2006.01)
*G06F 13/16*    (2006.01)

(52) U.S. Cl.
CPC .......... *G06F 11/1443* (2013.01); *G06F 3/061* (2013.01); *G06F 3/0659* (2013.01); *G06F 3/0679* (2013.01); *G06F 13/1642* (2013.01); *G06F 13/1673* (2013.01)

(58) Field of Classification Search
CPC .... G06F 11/1443; G06F 3/061; G06F 3/0659; G06F 3/0679; G06F 13/1642; G06F 13/1673
See application file for complete search history.

(56) References Cited

U.S. PATENT DOCUMENTS

| | | | |
|---|---|---|---|
| 10,365,829 B2* | 7/2019 | Chen ..................... | G06F 3/061 |
| 10,658,056 B2* | 5/2020 | Natarajan .......... | G11C 16/3459 |
| 2017/0192719 A1* | 7/2017 | Park ....................... | G06F 3/065 |
| 2018/0018221 A1* | 1/2018 | Magro ................ | G06F 11/1016 |

FOREIGN PATENT DOCUMENTS

| KR | 100823175 | 4/2008 |
|---|---|---|
| KR | 1020170029261 | 3/2017 |

* cited by examiner

*Primary Examiner* — Cheng Yuan Tseng
(74) *Attorney, Agent, or Firm* — IP & T Group LLP

(57) ABSTRACT

There are provided a memory system and an operating method thereof. The memory system includes: a memory device including a plurality of semiconductor memories; and a controller for generating a plurality of command queues respectively corresponding to the plurality of semiconductor memories by queuing a plurality of commands received from a host, and controlling the plurality of semiconductor memories to perform overall operations by outputting the plurality of commands queued in the plurality of command queues, wherein the controller holds a first command queue, among the plurality of command queues, corresponding to a first semiconductor memory, among the plurality of semiconductor memories, in which a program fail has occurred.

18 Claims, 8 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2018-0025316, filed on Mar. 2, 2018, the entire disclosure of which is incorporated herein by reference in its entirety.

BACKGROUND

1. Field of Invention

The present disclosure generally relates to a memory system and an operating method thereof, and more particularly, to a memory system capable of efficiently processing a program fail and an operating method of the memory system.

2. Description of Related Art

The paradigm of the recent computer environment has shifted to ubiquitous computing in which computing systems can be used anywhere and anytime. This promotes increasing usage of portable electronic devices such as mobile phones, digital cameras, notebook computers, and the like. Such portable electronic devices may generally include a memory system using a memory device, i.e., a data storage device. The data storage device is used as a main memory device or an auxiliary memory device of the portable electronic devices.

A data storage device using a memory device has excellent stability and durability, high information access speed, and low power consumption, since there is no mechanical driving part. In memory systems having such advantages, the data storage device includes a Universal Serial Bus (USB) memory device, memory cards having various interfaces, a Solid State Drive (SSD), and the like.

SUMMARY

Embodiments provide a memory system capable of efficiently processing a program fail when the program fail occurs in one semiconductor memory in an operation of the memory system including a plurality of semiconductor memories, and an operating method of the memory system.

According to an aspect of the present disclosure, there is provided a memory system including: a memory device including a plurality of semiconductor memories; and a controller configured to generate a plurality of command queues respectively corresponding to the plurality of semiconductor memories by queuing a plurality of commands received from a host, and control the plurality of semiconductor memories to perform overall operations by outputting the plurality of commands queued in the plurality of command queues, wherein the controller holds a first command queue, among the plurality of command queues, corresponding to a first semiconductor memory, among the plurality of semiconductor memories, in which a program fail has occurred.

According to another aspect of the present disclosure, there is provided a memory system including: a memory device including a plurality of semiconductor memories; a controller configured to control the memory device in response to a plurality of commands received from a host, wherein the controller includes: a processor configured to generate a plurality of command queues respectively corresponding to the plurality of semiconductor memories by queuing the plurality of commands; a flash control circuit configured to control the plurality of semiconductor memories to perform overall operations by outputting the plurality of commands queued in the plurality of command queues; and a memory buffer configured to temporarily store first data received from the host and then output the first data to the memory device, or temporarily store second data received from the memory device and then output the second data to the host, wherein the flash control circuit holds a first command queue, among the plurality of command queues, corresponding to a first semiconductor memory, among the plurality of semiconductor memories, in which a program fail has occurred.

According to still another aspect of the present disclosure, there is provided a method for operating a memory system, the method including: generating a plurality of command queues respectively corresponding to a plurality of semiconductor memories by queuing a plurality of commands received from a host; performing overall operations of the plurality of semiconductor memories by outputting the plurality of commands queued in the plurality of command queues; holding a first command queue, among the plurality of command queues, corresponding to a first semiconductor memory, among the plurality of semiconductor memories, in which a program fail has occurred; and performing a program fail recovery operation of the first semiconductor memory, when the overall operations of all other semiconductor memories except the first semiconductor memory among the plurality of semiconductor memories are completed.

According to another aspect of the present disclosure, there is provided a memory system including: first and second memory devices; and a controller configured to control the first and second memory devices to perform operations by queueing commands in first and second queues for the first and second memory devices and providing the queued commands in the first and second queues to the first and second memory devices respectively, wherein the controller holds, when a program fail occurs in the first memory device, the queued commands in the first queue until the second memory device completes operations in response to all of the commands in the second queue, wherein the controller performs, after the second memory device completes operations in response to all of the commands in the second queue, a recovery operation to a program command corresponding to the program fail, re-queues a recovered program command in the first queue and resumes providing the queued commands from the first queue.

BRIEF DESCRIPTION OF THE DRAWINGS

Various embodiments will now be described more fully with reference to the accompanying drawings; however, elements and features of the present invention may be arranged or configured differently than shown and described herein. Thus, the present invention is not limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Like reference numerals refer to like elements throughout. Also, throughout the specification, reference to "an embodiment," "another embodiment," and the like is not necessarily to only one embodiment, and different references to any such phrase are not necessarily to the same embodiment(s).

FIG. 1 is a block diagram illustrating a memory system according to an embodiment of the present disclosure.

FIG. 2 is a block diagram illustrating a configuration of a controller, e.g., the controller of FIG. 1.

FIG. 3 is a block diagram illustrating a semiconductor memory, e.g., the semiconductor memory of FIG. 1.

FIG. 4 is a block diagram illustrating an embodiment of a memory cell array of FIG. 3.

FIG. 5 is a circuit diagram illustrating a memory block shown in FIG. 4.

FIG. 6 is a flowchart illustrating an operation of the memory system according to an embodiment of the present disclosure.

FIG. 7 is a diagram illustrating operations of command queues according to an embodiment of the present disclosure.

FIG. 8 is a diagram illustrating another embodiment of the memory system.

FIG. 9 is a diagram illustrating another embodiment of the memory system.

FIG. 10 is a diagram illustrating another embodiment of the memory system.

FIG. 11 is a diagram illustrating another embodiment of the memory system.

DETAILED DESCRIPTION

Figure 1:
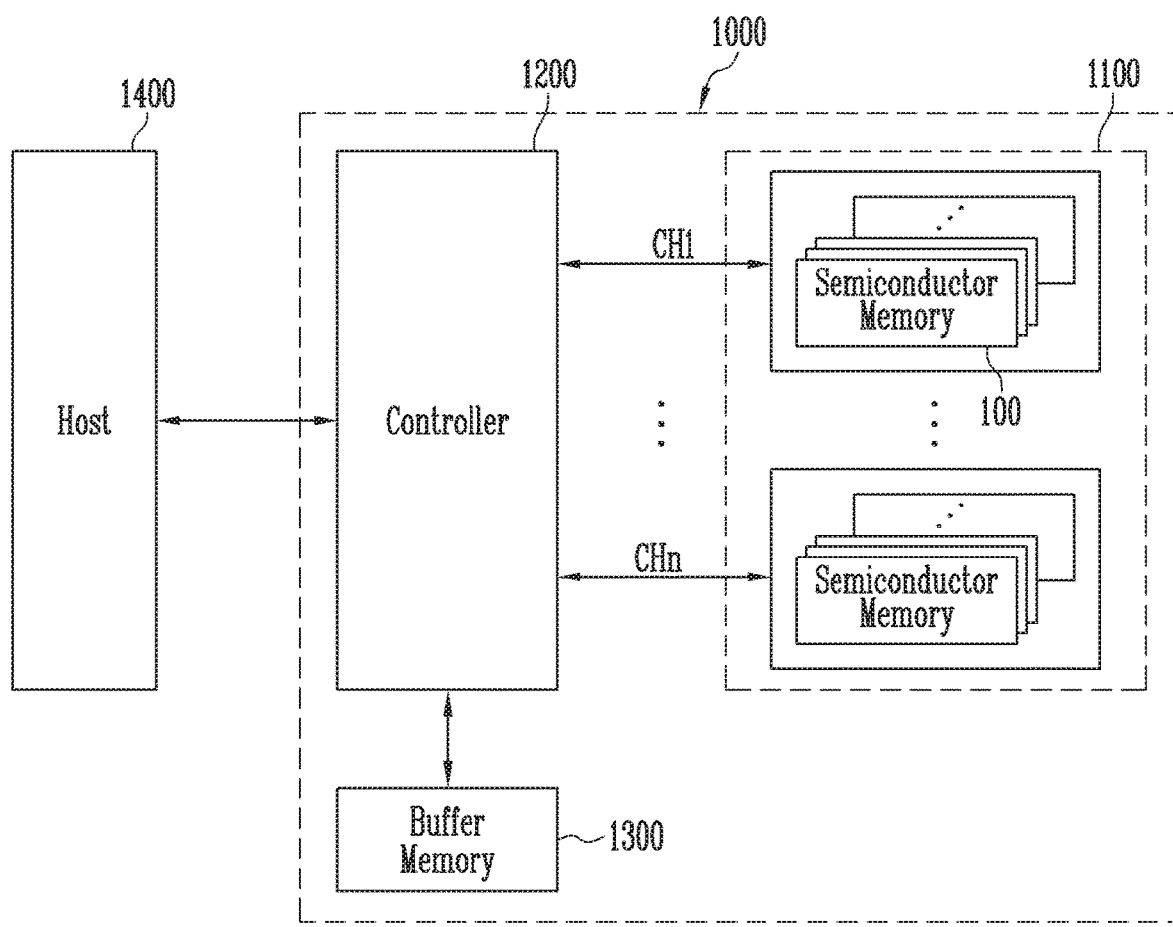

The specific structural or functional description herein is for the purpose of describing embodiments of the present disclosure. The embodiments, however, may be implemented in other forms, as will be understood by those skilled in the art in light of the present disclosure. Thus, the present invention is not limited to the embodiments set forth herein.

The disclosed embodiments may be modified in various different ways, e.g., in terms of construction, configuration, arrangement, and the like. Thus, the present invention is not limited to the specifics disclosed herein. Rather, the present invention includes all changes, equivalents, or substitutes that do not depart from the spirit and technical scope of the present disclosure.

While terms such as "first" and "second" may be used to identify various components, such components are not limited to the above terms.

The above terms are used only to distinguish one component from another that otherwise have the same or similar names. For example, a first component may be referred to as a second component without departing from the scope of rights of the present disclosure, and likewise a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Other expressions describing relationships between components such as "between," "immediately between" or "adjacent to" and "directly adjacent to" may be construed similarly.

The terms used in the present application are merely used to describe particular embodiments, and are not intended to limit the present disclosure. Singular forms in the present disclosure are intended to include the plural forms and vice versa, unless the context clearly indicates otherwise. It will be further understood that terms such as "including" or "having," etc., are intended to indicate the existence of the features, numbers, operations, actions, components, parts, or combinations thereof disclosed in the specification, but are not intended to preclude the possibility that one or more other features, numbers, operations, actions, components, parts, or combinations thereof may be present or added.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

In describing embodiments, description of techniques that are well known in the art to which the present disclosure pertains and not directly related to the present disclosure is omitted so as not to unnecessarily obscure aspects of the present invention.

Various embodiments of the present disclosure will be described in detail with reference to the accompanying drawings to enable those skilled in the art to readily implement the present disclosure.

FIG. 1 is a block diagram illustrating a memory system according to an embodiment of the present disclosure.

Referring to FIG. 1, the memory system 1000 includes a memory device 1100, a controller 1200, and a buffer memory 1300.

The memory device 1100 includes a plurality of semiconductor memories 100, which may be divided into a plurality of groups.

FIG. 1 illustrates that the plurality of, e.g., n, groups of semiconductor memories communicate with the controller 1200 respectively through first to nth channels CH1 to CHn respectively. Each semiconductor memory 100 will be described later with reference to FIG. 3.

Each group is configured to communicate with the controller 1200 through one common channel. The controller 1200 is configured to control the plurality of semiconductor memories 100 of the memory device 1100 through the plurality of channels CH1 to CHk.

The controller 1200 is coupled to a host 1400 and the memory device 1100. The controller 1200 is configured to access the memory device 1100 in response to a command received from the host 1400. For example, the controller 1200 is configured to control overall operations such as read, program, erase, and background operations of the memory device 1100 in response to a command received from the host 1400. The controller 1200 is configured to provide an interface between the memory device 1100 and the host 1400. The controller 1200 is configured to drive firmware for controlling the memory device 1100.

When a program fail occurs in at least one semiconductor memory, among the plurality of semiconductor memories 100 in the memory device 1100, during a program operation, the controller 1200 may hold a command output operation of a command queue corresponding to the semiconductor memory in which the program fail occurs, and output a command of a command queue corresponding to the other semiconductor memories to control the other semiconductor memories to perform overall operations corresponding to the output command. Also, after the overall operations of the other semiconductor memories are completed, the controller 1200 may perform a program fail recovery operation on the semiconductor memory in which the program fail has occurred, and control the semiconductor memory in which the program fail occurs to be operated in response to a re-queued command.

The buffer memory 1300 may temporarily store data read from the memory device 1100 in a read operation and then output the data to the host 1400 in response to a request from the host 1400. Alternatively, the buffer memory 1300 may temporarily store data received from the host 1400 in a program operation and then output the data to the memory device 1100 in response to a request from the host 1400. In an embodiment of the present disclosure, the buffer memory 1300 is Illustrated and described as a component separate from the controller 1200, but in another embodiment the controller 1200 may be configured to include the buffer memory 1300.

The host 1400 controls the memory system 1000. The host 1400 includes portable electronic devices such as a computer, a PDA, a PMP, an MP3 player, a camera, a camcorder, and a mobile phone. The host 1400 may request a program, read or erase operation of the memory system 1000 through a command.

The controller 1200 and the memory device 1100 may be integrated into a single semiconductor device. In an embodiment, the controller 1200 and the memory device 1100 may be integrated into a single semiconductor device to constitute a memory card such as a PC card (Personal Computer Memory Card International Association (PCMCIA)), a Compact Flash (CF) card, a Smart Media Card (SM or SMC), a memory stick, a Multi-Media Card (MMC, RS-MMC or MMCmicro), an SD card (SD, miniSD, microSD or SDHC), or a Universal Flash Storage (UFS).

In another embodiment, the controller 1200 and the memory device 1100 may be Integrated into a single semiconductor device to constitute a semiconductor drive (Solid State Drive (SSD)) that Includes a storage device configured to store data in a semiconductor memory. If the memory system 1000 is used as the semiconductor drive SSD, the operating speed of the host 1400 coupled to the memory system 1000 can be remarkably improved.

In another example, the memory system 1000 may be provided as one of various components of an electronic device such as a computer, an Ultra Mobile PC (UMPC), a workstation, a net-book, a Personal Digital Assistant (PDA), a portable computer, a web tablet, a wireless phone, a mobile phone, a smart phone, an e-book, a Portable Multi-Media Player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

In an embodiment, the memory device 1100 or the memory system 1000 may be packaged in various forms such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), Plastic Metric Quad Flat Pack (PMQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi-Chip Package (MCP), Wafer-level Fabricated Package (WFP), or Wafer-level processed Stack Package (WSP).

Figure 2:
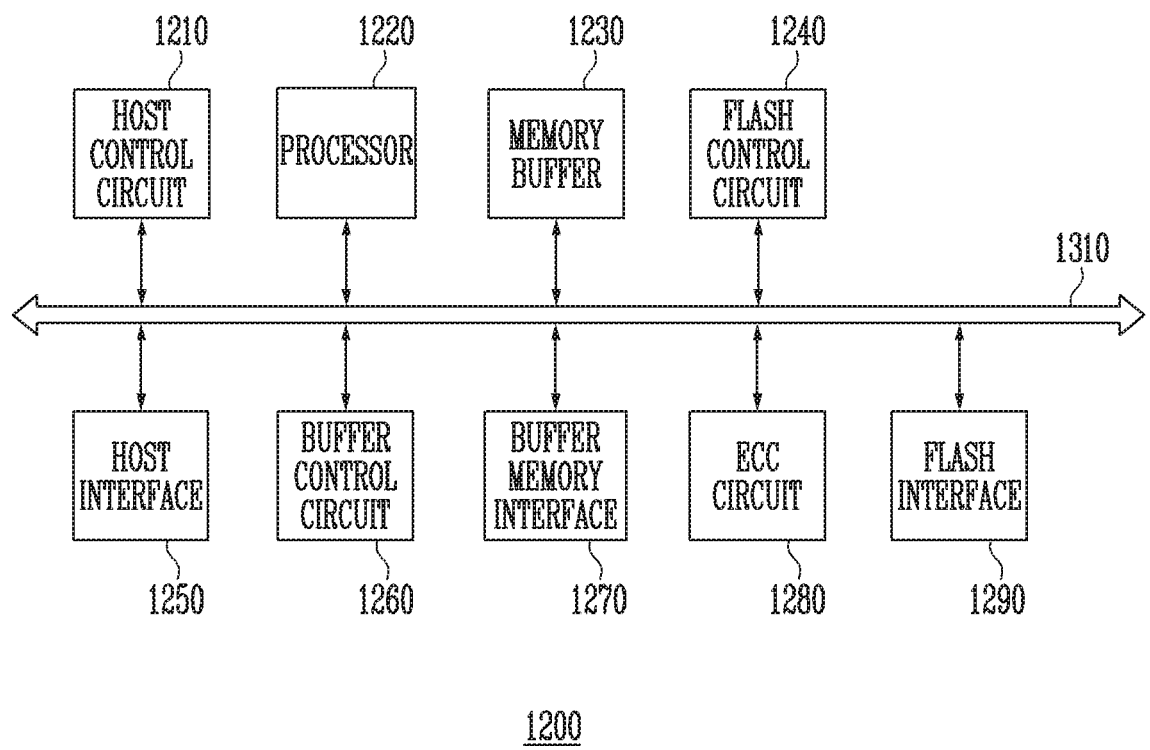

FIG. 2 is a block diagram illustrating a configuration of a controller, e.g., the controller of FIG. 1.

Referring to FIG. 2, the controller 1200 may include a host control circuit 1210, a processor 1220, a memory buffer 1230, a flash control circuit 1240, a host interface 1250, a buffer control circuit 1260, a buffer memory interface 1270, an error correction code (ECC) circuit 1280, a flash interface 1290, and a bus 1310.

The bus 1310 may be configured to provide channels between components of the controller 1200.

The host control circuit 1210 may control data transmission between the host 1400 of FIG. 1, and the host interface 1250 and a controller memory buffer, i.e., the memory buffer 1230 or the buffer memory 1300 of FIG. 1. In an example, the host control circuit 1210 may control an operation of buffering data input from the host 1400 to the memory buffer 1230 or the buffer memory 1300 via the host interface 1250. In another example, the host control circuit 1210 may control an operation of outputting data buffered to the memory buffer 1230 or the buffer memory 1300 to the host 1400 via the host Interface 1250.

The processor 1220 may control the overall operations of the controller 1200, and perform a logical operation. The processor 1220 may communicate with the host 1400 of FIG. 1 through the host interface 1250, and communicate with the memory device 1100 of FIG. 1 through the flash interface 1290. Also, the processor 1220 may communicate with the buffer memory 1300 of FIG. 1 through the buffer memory Interface 1270. Also, the processor 1220 may control the memory buffer 1230 through the buffer control circuit 1260. The processor 1220 may control an operation of the memory system 1000 by using the memory buffer 1230 as a working memory, a cache memory or a buffer memory. Also, the processor 1220 drives firmware called as a Flash Translation Layer (hereinafter, referred to as 'FTL') to control the overall operations of the controller 1200. The FTL may be stored in the memory buffer 1230.

The processor 1220 may generate a plurality of command queues by aligning commands received from the host 1400 according to their orders of priority. The plurality of command queues may preferably correspond to the plurality of semiconductor memories 100 of the memory device 1100, respectively.

Also, when it is determined that a program fail has occurred in at least one semiconductor memory, among the plurality of semiconductor memories 100 of the memory device 1100, during a program operation, the processor 1220 may perform a program fail recovery operation. The processor 1220 may detect the program fail by receiving a report on the program fail from the semiconductor memory 100 in which the program fail has occurred. In the program fail recovery operation, the processor 1220 may receive data transmitted from a page buffer group of the semiconductor memory in which it was determined that the program fail has occurred, store the data in the memory buffer 1230 or the buffer memory 1300, change an address of a program command queued in a command queue corresponding to the semiconductor memory in which the program fail has occurred, and re-queue the program command in the command queue. The processor 1220 may search for a read command having the same address as that at which the program operation has failed in the command queue corresponding to the semiconductor memory in which the program fail has occurred. When the read command is found, the processor 1220 may remove the read command, or correct an address of the read command to the changed address and re-queue commands including the corrected read command.

The memory buffer 1230 may be used as the working memory, the cache memory or the buffer memory of the processor 1220. The memory buffer 1230 may store codes and commands, which are executed by the processor 1220. The memory buffer 1230 may include a Static RAM (SRAM) or a Dynamic RAM (DRAM). The memory buffer 1230 may store a plurality of commands queued by the processor 1220.

The flash control circuit 1240 may output the queued commands for controlling the plurality of semiconductor memories 100 of the memory device 1100. Also, the flash control circuit 1240 may stop the output of a command for controlling a semiconductor memory in which a program fail has occurred among the plurality of semiconductor memories 100 of the memory device 1100 by holding a command queue corresponding the semiconductor memory, or may resume the stopped output of the queued command by releasing the holding of the command queue. In an example, the flash control circuit 1240 may be included as a component of the processor 1220 in the processor 1220.

The host interface 1250 is configured to communicate with the host 1400 of FIG. 1 under the control of the processor 1220. The host interface 1250 may be configured to communicate with the host 1400, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI express (PCIe), a Nonvolatile Memory Express (NVMe), a Universal Flash Storage (UFS), a Secure Digital (SD), a Multi-Media Card (MMC), an Embedded MMC (eMMC), a Dual In-line Memory Module (DIMM), a Registered DIMM (RDIMM), and a Load Reduced DIMM (LRDIMM).

The buffer control circuit 1260 is configured to control the memory buffer 1230 under the control of the processor 1220.

The buffer memory interface 1270 may be configured to communicate with the buffer memory 1300 of FIG. 1 under the control of the processor 1220. The buffer memory interface 1270 may communicate a command, an address, and data with the buffer memory 1300 through a channel.

The ECC circuit 1280 may perform error correction. The ECC circuit 1280 may perform ECC encoding on data to be written in the memory device 1100 of FIG. 1 through the flash interface 1290. The ECC-encoded data may be transferred to the memory device 1100 through the flash interface 1290. The ECC circuit 1280 may perform ECC decoding on data received from the memory device 1100 through the flash interface 1290. In an example, the ECC circuit 1280 may be included as a component of the flash interface 1290 in the flash interface 1290.

The flash interface 1290 is configured to communicate with the memory device 1100 of FIG. 1 under the control of the processor 1220. The flash interface 1290 may communicate command control signals, an address, and data with the memory device 1100 through a channel. Also, when an operation of the memory device 1100 is successfully performed or when the operation fails due to the occurrence of an error, the flash interface 1290 may receive a report signal indicating that the operation has been successfully performed or that the operation has failed.

Figure 3:
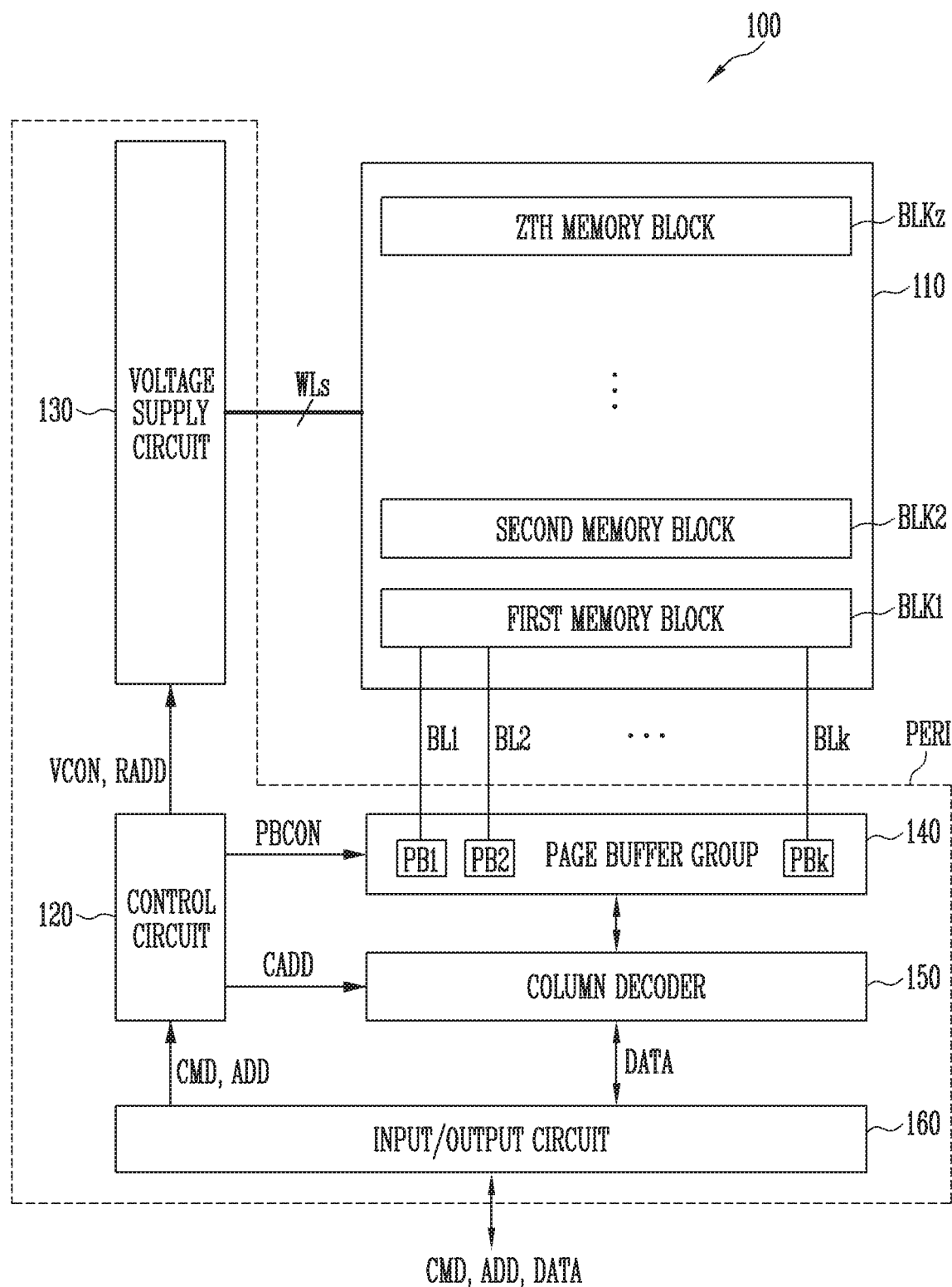

FIG. 3 is a block diagram illustrating a semiconductor memory, e.g., that of FIG. 1.

Referring to FIG. 3, the semiconductor memory 100 includes a memory cell array 110 including a plurality of memory blocks BLK1 to BLKz, and a peripheral circuit PERI configured to perform a program, read or erase operation of memory cells in a selected page of the plurality of memory blocks BLK1 to BLKz. The peripheral circuit PERI includes a control circuit 120, a voltage supply circuit 130, a page buffer group 140, a column decoder 150, and an input/output circuit 160.

The memory cell array includes a plurality of memory blocks BLK1 to BLKz. Each of the plurality of memory blocks BLK1 to BLKz includes a plurality of pages. Each of the plurality of pages includes a plurality of memory cells. In an embodiment, the plurality of memory cells may be nonvolatile memory cells. This will be described in more detail with reference to FIGS. 4 and 5.

The control circuit 120 outputs a voltage control signal VCON for generating a voltage required to perform a read, program or erase operation in response to a command CMD input through the input/output circuit 160, and outputs a PB control signal PBCON for controlling page buffers PB1 to PBk in the page buffer group 140 according to the kind of operation. Also, the control circuit 120 outputs a row address signal RADD and a column address signal CADD in response to an address signal ADD input from an external source through the input/output circuit 160. Also, when a program fail occurs during a program operation, the control circuit 120 may report this to the processor 1220 of FIG. 2.

The voltage supply circuit 130 supplies operating voltages required to perform program, read, and erase operations of memory cells in response to the voltage control signal VCON of the control circuit 120 to local lines including a drain select line, word lines WLs, and a source select line of a selected memory block. The voltage supply circuit 130 includes a voltage generating circuit and a row decoder.

The voltage generating circuit outputs operating voltages required to perform program, read, and erase operations of memory cells to global lines in response to the voltage control signal VCON of the control circuit 120.

The row decoder couples the global lines and the local lines such that the operating voltages output to the global lines by the voltage generating circuit can be transferred to the local lines of the selected memory block in the memory cell array 110.

The page buffer group 140 includes a plurality of page buffers PB1 to PBk coupled to the memory cell array 110 respectively through bit lines BL1 to BLk. The page buffers PB1 to PBk selectively precharge the bit lines BL1 to BLk according to input data DATA so as to store the data DATA in the memory cells in response to the PB control signal PBCON of the control circuit 120, or sense voltages of the bit lines BL1 to BLk so as to read the data DATA from the memory cells.

The column decoder 150 selects the page buffers PB1 to PBk in the page buffer group 140 in response to the column address signal CADD output from the control circuit 120. That is, the column decoder 150 sequentially transfers data DATA to be stored in the memory cells to the page buffers PB1 to PBk in response to the column address signal CADD. Also, the column decoder 150 sequentially selects the page buffers PB1 to PBk in response to the column address signal CADD such that data DATA of the memory cells, which are latched to the page buffers PB1 to PBk in a read operation, can be output externally.

In order to input, to the page buffer group 140, data DATA input to be stored in the memory cells in a program operation, the input/output circuit 160 transfers the data DATA to the column decoder 150 under the control of the control circuit 120. When the column decoder 150 transfers the data DATA transferred from the input/output circuit 160 to the page buffers PB1 to PBk of the page buffer group 140, the page buffers PB1 to PBk store the input data DATA to latch circuits therein. Also, in a read operation, the input/output circuit 160 outputs, externally, the data DATA transferred from the page buffers PB1 to PBk through the column decoder 150.

Figure 4:
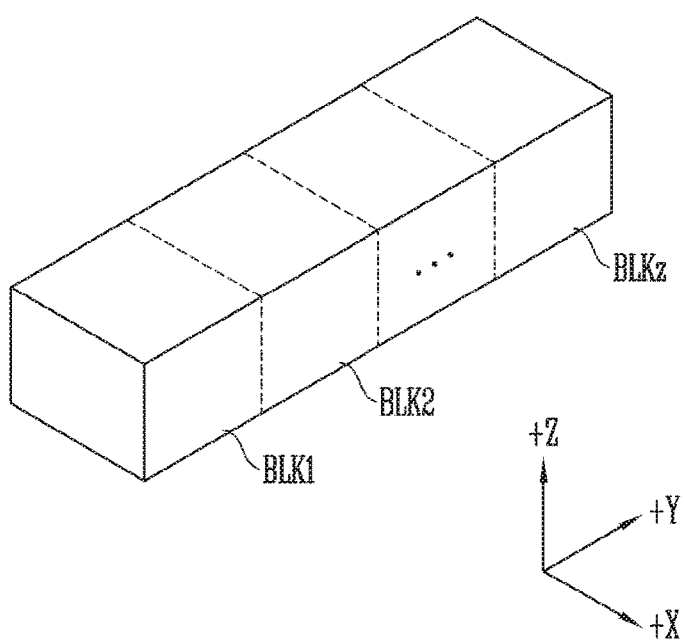

FIG. 4 is a block diagram illustrating an embodiment of the memory cell array of FIG. 3.

Referring to FIG. 4, the memory cell array 110 includes a plurality of memory blocks BLK1 to BLKz. Each memory block has a three-dimensional structure. Each memory block includes a plurality of memory cells stacked above a substrate. The plurality of memory cells are arranged along +X, +Y, and +Z directions. The structure of each memory block will be described in more detail with reference to FIG. 5.

Figure 5:
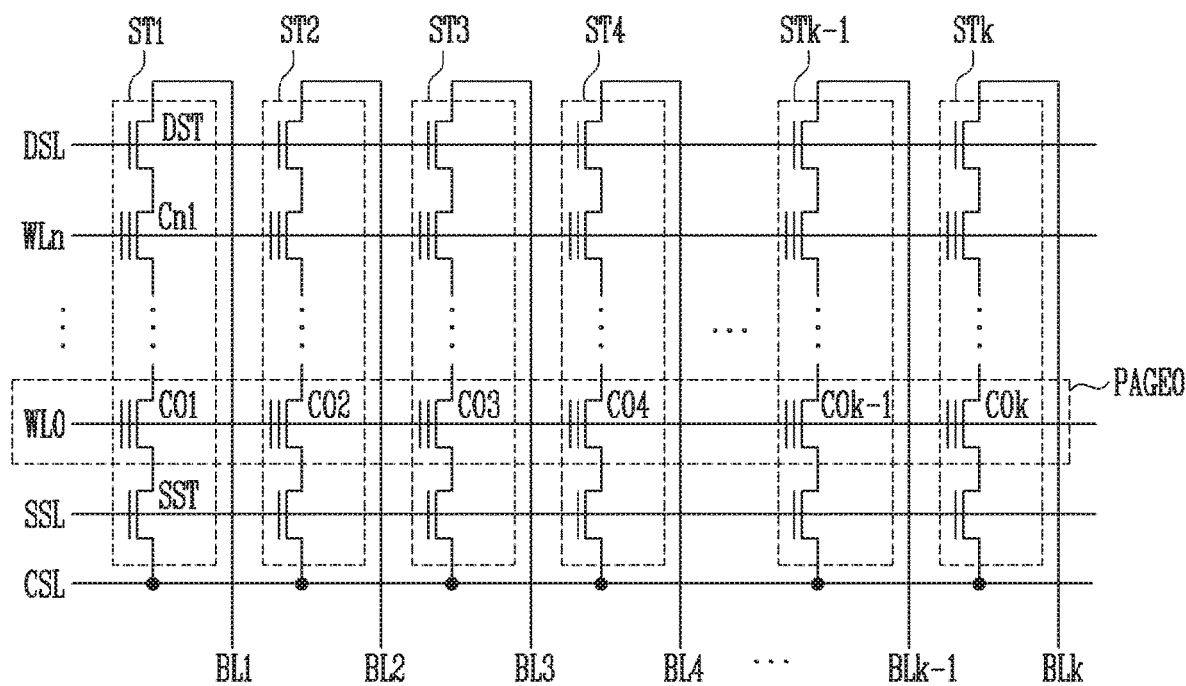

FIG. 5 is a circuit diagram Illustrating the memory block shown in FIG. 4.

Referring to FIG. 5, each memory block includes a plurality of strings ST1 to STk coupled between bit lines BL1 to BLk and a common source line CSL. That is, the strings ST1 to STk are coupled to corresponding bit lines BL1 to BLk, respectively, and are commonly coupled to the common source line CSL. Each string ST1 includes a source select transistor SST having a source coupled to the common source line CSL, a plurality of memory cells C01 to Cn1, and a drain select transistor DST having a drain coupled to the bit line BL1. The memory cells C01 to Cn1 are coupled in series between the select transistors SST and DST. A gate of the source select transistor SST is coupled to a source select line SSL, gates of the memory cells C01 to Cn1 are coupled to word lines WL0 to WLn, respectively, and a gate of the drain select transistor DST is coupled to a drain select line DSL.

Memory cells in a memory block may be divided in units of physical pages or logical pages. For example, the memory cells C01 to C0k coupled to one word line (e.g., WL0) constitute one physical page PAGE0. Such a page becomes a basic unit of the program operation or the read operation.

Figure 6:
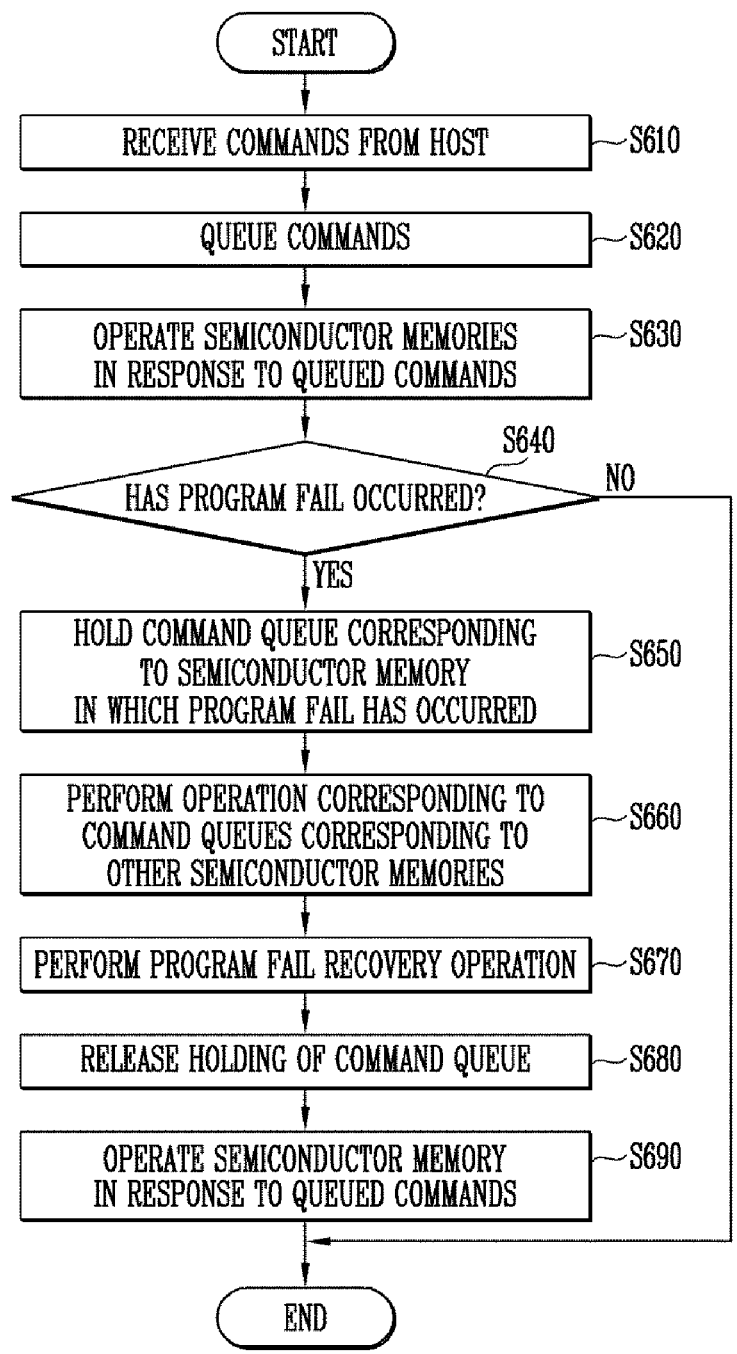

FIG. 6 is a flowchart illustrating an operation of the memory system 1000 according to an embodiment of the present disclosure.

Figure 7:
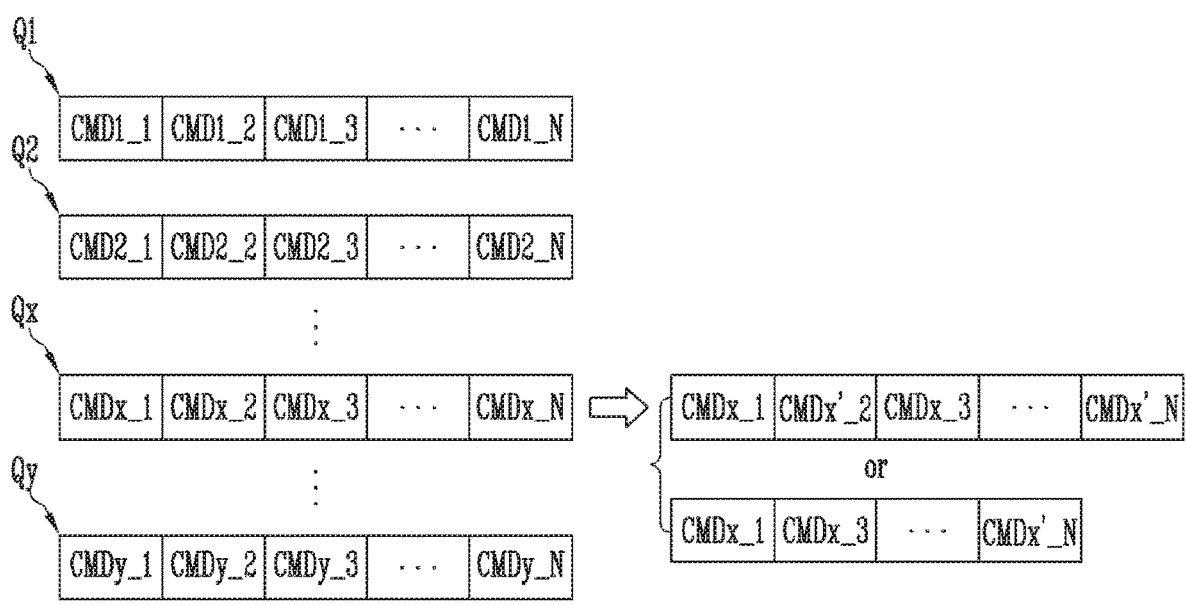

FIG. 7 is a diagram illustrating operations of command queues according to an embodiment of the present disclosure.

An operation of the memory system is described below with reference to FIGS. 1 to 7.

A plurality of commands are input from the host 1400 at step S610. The plurality of commands may be a program command, a read command, and an erase command.

The processor 1220 of the controller 1200 generates a plurality of command queues by queuing the commands received from the host 1400 according to their orders of priority at step S620. The plurality of command queues may respectively correspond to the plurality of semiconductor memories 100 of the memory device 1100. Referring to FIG. 7, in each of the plurality of command queues Q1 to Qy, a plurality of commands are queued according to their orders of priority. For example, first to Nth commands CMD1_1 to CMD1_N are sequentially queued in a first command queue Q1, first to Nth commands CMD2_1 to CMD2_N are sequentially queued in a second command queue Q2, first to Nth commands CMDx_1 to CMDx_N are sequentially queued in an xth command queue Qx, and first to Nth commands CMDy_1 to CMDy_N are sequentially queued in a yth command queue Qy. Although FIG. 7 illustrates that the same number of commands are queued in each command queue, the present invention is not limited to this arrangement. The numbers of commands queued in the command queues may be different in some cases.

The flash control circuit 1240 outputs the queued commands for controlling the plurality of semiconductor memories 100 of the memory device 1100. Referring to FIG. 7, each of the plurality of command queues Q1 to Qy may output commands queued therein according to their orders of priority. By way of example, it is described that the Nth commands CMD1_N, CMD2_N, . . . , CMDx_N, and CMDy_N are first output, and commands queued in the left direction are then sequentially output.

The plurality of semiconductor memories 100 perform overall operations in response to commands output from the flash control circuit 1240 at step S630. When assuming that the Nth command CMDx_N output from the xth command queue Qx is a program command, the semiconductor memory 100, which corresponds to the xth command queue Qx, performs a program operation in response to the Nth command CMDx_N.

At step S640, the processor 1220 detects whether a program fail has occurred during an operation of the memory device 1100. The plurality of semiconductor memories 100 may perform operations in response to corresponding commands output from the command queue.

When a program fail occurs during a program operation, the semiconductor memory 100 may report the program fail to the processor 1220 of the controller 1200. The processor 1220 may detect whether the program fail has occurred according to the report received from the semiconductor memory 100.

When a program fail is not detected in the plurality of semiconductor memories 100 during the overall operations ("No" at step S640), the plurality of semiconductor memories 100 may perform next overall operations in response to next commands that are consecutively received. When all operations are completed without a program failure in response to all commands output from the plurality of command queues Q1 to Qy, the process may end.

When a program fail is detected to have occurred in at least one semiconductor memory among the plurality of semiconductor memories 100 during the program operation ("YES" at step S640), the flash control circuit 1240 stops the output of a command for controlling the semiconductor memory in which the program fail has occurred by holding a command queue corresponding to the semiconductor memory in which the program fail has occurred under the control of the processor 1220 at step S650. For example, when the program fail occurs while the semiconductor memory 100 corresponding to the xth command queue Qx of FIG. 7 is performing a program operation corresponding to the Nth command CMDx_N that is a program command, the flash control circuit 1240 holds the xth command queue Qx.

The flash control circuit 1240 outputs commands queued in the other command queues Q1, Q2, . . . , and Qy, except the held xth command queue Qx, and the other semiconductor memories, except the semiconductor memory in which the program fail has occurred, continuously perform overall operations in response to commands output from the other command queues at step S660.

When the other semiconductor memories, except the semiconductor memory in which the program fail has occurred, complete overall operations in response to the commands output from the other command queues Q1, Q2, . . . , and Qy, except the held xth command queue Qx, the processor 1220 performs a program fail recovery operation on the semiconductor memory in which the program fail has occurred at step S670.

In the program fail recovery operation, the processor 1220 controls the flash interface 1290, the buffer control circuit 1260 or the buffer memory interface 1270 to receive data from a page buffer group of the semiconductor memory in which the program fail has occurred and store the data in the memory buffer 1230 or the buffer memory 1300. Also, the processor 1220 changes an address of a program command queued in a command queue corresponding to the semiconductor memory in which the program fail has occurred, and re-queues the program command in the command queue. Also, the processor 1220 searches for a read command having the same address as that at which the program operation has failed in the command queue corresponding to the semiconductor memory in which the program fail has occurred. When the read command exists in the command queue corresponding to the semiconductor memory in which the program fail has occurred, the processor 1220 removes the command, or corrects an address of the read command to the changed address and re-queues commands including the corrected read command.

Referring to FIG. 7, the processor 1220 generates a new command CMDx'_N by changing an address (e.g., a block address) of the Nth command CMDx_N that is a program command queued in the xth command queue Qx corresponding to the semiconductor memory in which the program fail has occurred, and queues the new command CMDx'_N in the xth command queue Qx. Also, the processor 1220 searches for a read command having the same address as that (e.g., a block address) at which the program fail has occurred in the xth command queue Qx.

When the read command exists (e.g., CMDx_2) in the xth command queue Qx, the processor 1220 generates a new read command CMDx'_2 by removing the read command CMDx_2 or correcting an address of the read command CMDx_2 to the changed address, and queues the new read command CMDx'_2 in the xth command queue Qx.

The flash control circuit 1240 resumes the stopped output of the command by releasing the holding of the xth command queue Qx at step S680.

The semiconductor memory in which the program fail has occurred performs operations corresponding to commands output from the flash control circuit 1240 at step S690.

Figure 8:
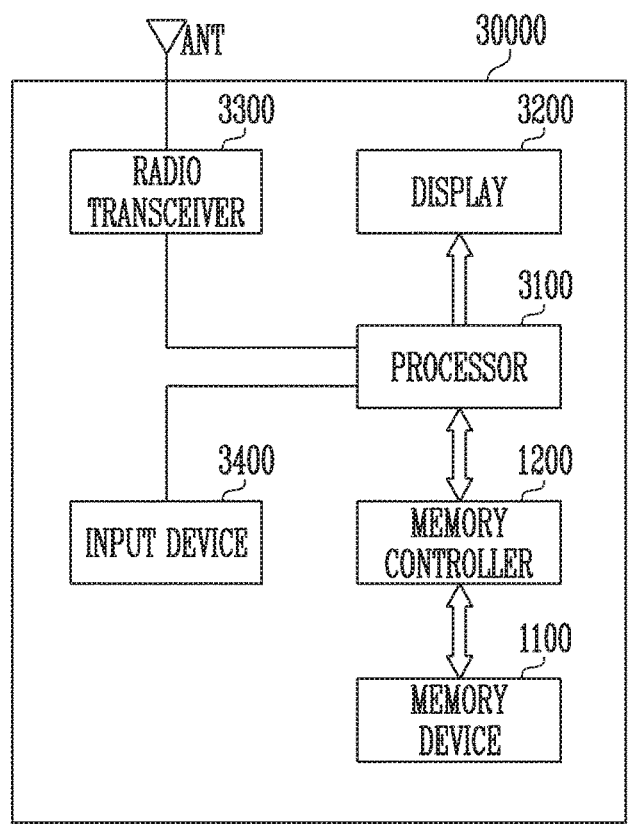

FIG. 8 is a diagram illustrating another embodiment of the memory system.

Referring to FIG. 8, the memory system 30000 may be implemented as a cellular phone, a smart phone, a tablet PC, a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may convert a signal output from the processor 3100 into a radio signal, and output the converted radio signal to an external device through the antenna ANT. An input device 3400 is a device capable of Inputting a control signal for controlling an operation of the processor 3100 or data to be processed by the processor 3100, and may be Implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the memory device 1100 may be implemented as a part of the processor 3100, or be implemented as a chip separate from the processor 3100. Also, the memory controller 1200 may be implemented with the controller 1200 shown in FIG. 2.

Figure 9:
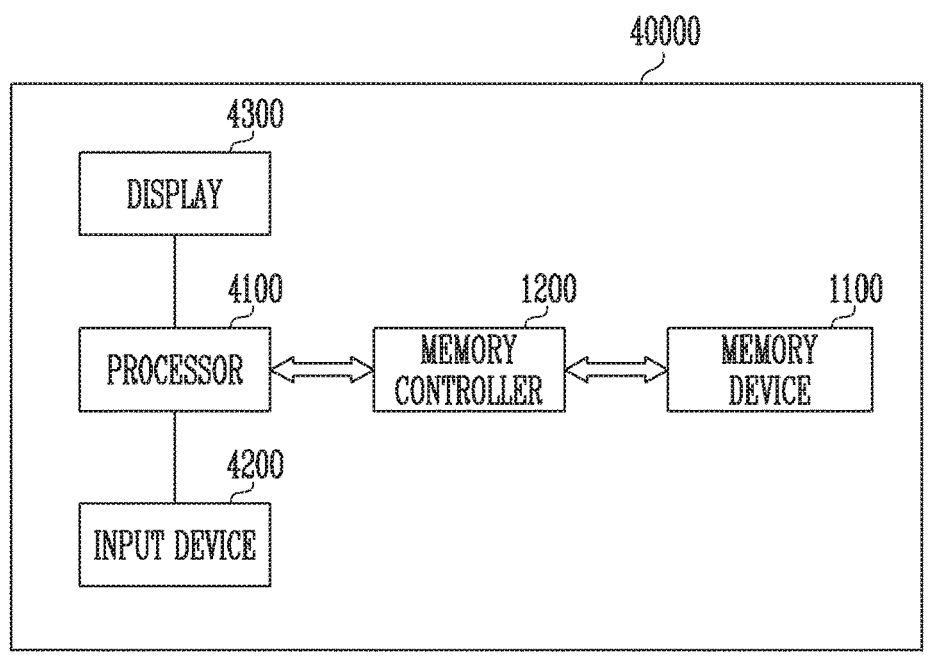

FIG. 9 is a diagram illustrating another embodiment of the memory system.

Referring to FIG. 9, the memory system 40000 may be implemented as a personal computer (PC), a tablet PC, a net-book, an e-reader, a personal digital assistant (PDA), a portable multi-media player (PMP), an MP3 player, or an MP4 player.

The memory system 40000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the memory device 1100 may be implemented as a part of the processor 4100, or be implemented as a chip separate from the processor 4100. Also, the memory controller 1200 may be implemented with the controller 1200 shown in FIG. 2.

Figure 10:
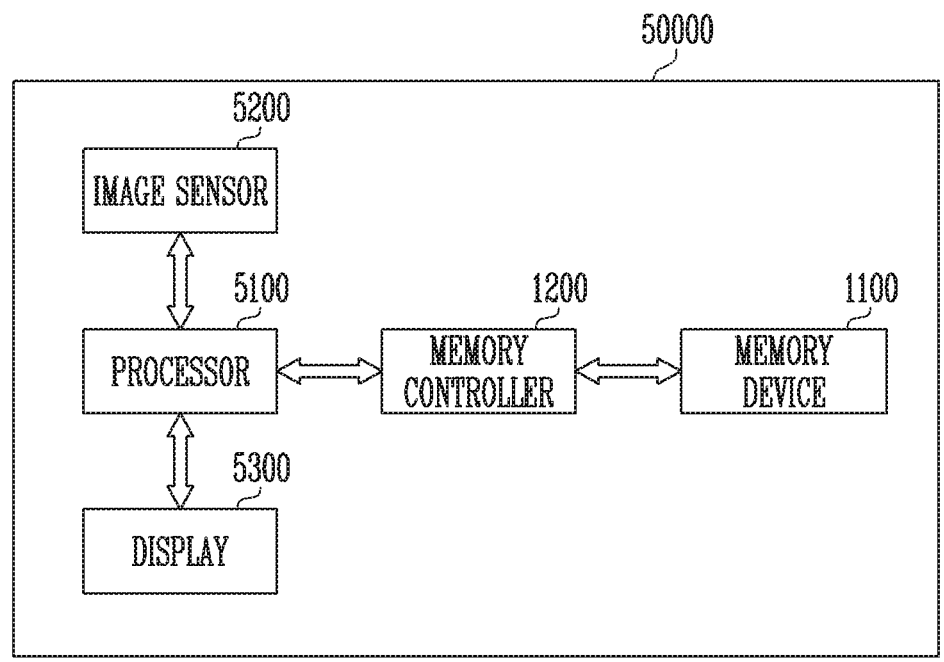

FIG. 10 is a diagram illustrating another embodiment of the memory system.

Referring to FIG. 10, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100. Also, the memory controller 1200 may be implemented with the controller 1200 shown in FIG. 2.

Figure 11:
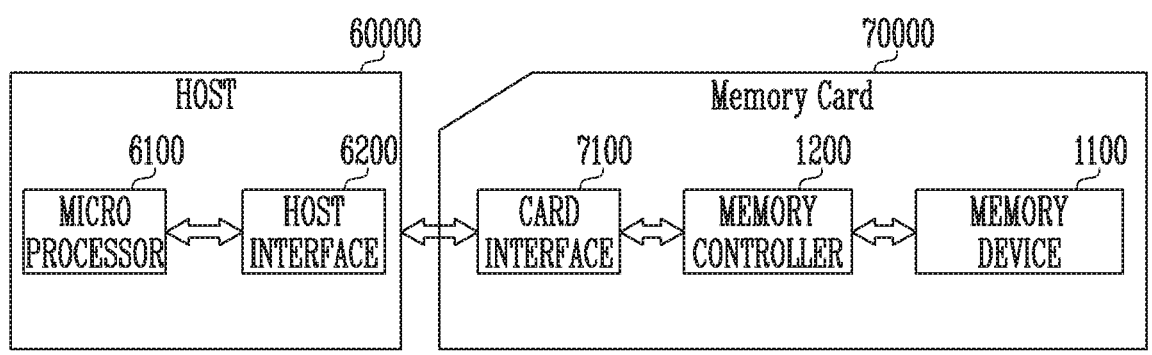

FIG. 11 is a diagram illustrating another embodiment of the memory system.

Referring to FIG. 11, the memory system 70000 may be implemented as a memory card or a smart card. The memory system 70000 may include a memory device 1100, a memory controller 1200, and a card interface 7100.

The memory controller 1200 may control data exchange between the memory device 1100 and the card Interface 7100. In some embodiments, the card interface 7100 may be a secure digital (SD) card interface or a multi-media card (MMC) interface, but the present disclosure is not limited thereto. Also, the memory controller 1200 may be implemented with the controller 1200 shown in FIG. 2.

The card interface 7100 may interface data exchange between a host 60000 and the memory controller 1200 according to a protocol of the host 60000. In some embodiments, the card Interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host Interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor 6100.

According to embodiments of the present disclosure, when a program fail occurs in one among multiple semiconductor memories during an operation of the memory system, commands corresponding to the other semiconductor memories are processed, and the program fail of the one semiconductor memory is then processed, so that the overhead of an operation of re-queuing commands queued to process the program fall can be reduced.

Various embodiments have been disclosed, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
a plurality of semiconductor memories commonly connected to one channel; and
a controller configured to generate a plurality of command queues respectively corresponding to the plurality of semiconductor memories by queuing a plurality of commands received from a host, output the plurality of commands to each of the plurality of semiconductor memories through the one channel, and control the plurality of semiconductor memories to perform operations corresponding to the plurality of commands,
wherein the controller holds outputting of a command included in a command queue corresponding to one semiconductor memory among the plurality of semiconductor memories in response to a program fail of the one semiconductor memory, controls remaining semiconductor memories among the plurality of semiconductor memories to perform operations of the remaining semiconductor memories and performs a recovery operation of the program fail of the one semiconductor memory after the operations of the remaining semiconductor memories are completed, and
wherein the controller generates a new program command based on changing an address of the command on hold and re-queues the new program command in the command queue corresponding to the one semiconductor memory in the recovery operation.

2. The memory system of claim 1, wherein the controller:
reads and stores data stored in a page buffer group of the one semiconductor memory in the recovery operation; and
generates the new program command by changing, to a new address, an address of a program command included in the command queue corresponding to the one semiconductor memory.

3. The memory system of claim 2, wherein the controller searches for a read command having the same address as that of the program command, at which the program fail has occurred in the command queue corresponding to the one semiconductor memory.

4. The memory system of claim 3, wherein the controller generates a new read command by changing the address of the searched read command to the new address, and re-queues the new read command in the command queue corresponding to the one semiconductor memory.

5. The memory system of claim 3, wherein the controller removes the searched read command from the command queue corresponding to the one semiconductor memory.

6. The memory system of claim 2, wherein, after the recovery operation, the controller controls the one semiconductor memory to perform operations of the one semiconductor memory by outputting the commands included in the command queue corresponding to the one semiconductor memory to the one semiconductor memory.

7. A memory system comprising:
a plurality of semiconductor memories commonly connected to one channel; and
a controller configured to control the plurality of semiconductor memories in response to a plurality of commands received from a host,
wherein the controller includes:
a processor configured to generate a plurality of command queues respectively corresponding to the plurality of semiconductor memories by queuing the plurality of commands;
a flash control circuit configured to output the plurality of commands to each of the plurality of semiconductor memories through the one channel, and control the plurality of semiconductor memories to perform operations corresponding to the plurality of commands; and a memory buffer configured to temporarily store first data received from the host and then output the first data to the plurality of semiconductor memories, or temporarily store second data received from the plurality of semiconductor memories and then output the second data to the host, wherein the flash control circuit holds outputting of a command included in a command queue corresponding to one semiconductor memory among the plurality of semiconductor memories in response to a program fail of the one semiconductor memory, controls remaining semiconductor memories among the plurality of semiconductor memories to perform operations of the remaining semiconductor memories and performs a recovery operation of the program fail of the one semiconductor memory after the operations of the remaining semiconductor memories are completed, and wherein the controller generates a new program command based on changing an address of the command on hold and re-queues the new program command in the command queue corresponding to the one semiconductor memory in the recovery operation.

8. The memory system of claim 7, wherein the processor:
reads data stored in a page buffer group of the one semiconductor memory in the recovery operation and stores the read data in the memory buffer; and
generates the new program command by changing, to a new address, an address of a program command included in the command queue corresponding to the one semiconductor memory.

9. The memory system of claim 8, wherein the processor searches for a read command having the same address as that of the program command, at which the program fail has occurred in the command queue corresponding to the one semiconductor memory.

10. The memory system of claim 9, wherein the processor generates a new read command by changing the address of the searched read command to the new address, and re-queues the new read command in the command queue corresponding to the one semiconductor memory.

11. The memory system of claim 9, wherein the processor removes the searched read command from the command queue corresponding to the one semiconductor memory.

12. The memory system of claim 8, wherein, after the recovery operation, the processor controls the one semiconductor memory to perform operations of the one semiconductor memory by outputting the commands included in the command queue corresponding to the one semiconductor memory to the one semiconductor memory.

13. A method for operating a memory system, the method comprising:
generating a plurality of command queues respectively corresponding to a plurality of semiconductor memories, commonly connected to one channel, by queuing a plurality of commands received from a host;
outputting the plurality of commands to each of the plurality of semiconductor memories through the one channel;
performing operations of the plurality of semiconductor memories;
holding outputting of a command included in a command queue corresponding to one semiconductor memory among the plurality of semiconductor memories in response to a program fail of the one semiconductor memory;
performing operations of remaining semiconductor memories among the plurality of semiconductor memories; and
performing a recovery operation of the program fail of the one semiconductor memory after the operations of the remaining semiconductor memories are completed,
wherein the performing of the recovery operation includes:
generating a new program command based on changing an address of the command on hold; and
re-queuing the new program command in the command queue corresponding to the one semiconductor memory.

14. The method of claim 13, wherein the performing of the recovery operation includes:
reading data stored in a page buffer group of the one semiconductor memory and storing the data in a memory buffer; and
generating the new program command by changing, to a new address, an address of a program command included in the command queue corresponding to the one semiconductor memory.

15. The method of claim 14, further comprising, after the recovery operation, controlling the one semiconductor memory to perform operations of the one semiconductor memory by outputting the commands included in the command queue corresponding to the one semiconductor memory to the one semiconductor memory.

16. The method of claim 14, further comprising, after the generating of the new program command, searching for a read command having the same address as that of the program command, at which the program fail has occurred in the command queue corresponding to the one semiconductor memory.

17. The method of claim 16, further comprising:
generating a new read command by changing the address of the searched read command to the new address; and
re-queuing the new read command in the command queue corresponding to the one semiconductor memory.

18. The method of claim 16, further comprising, after the searching of the read command, removing the searched read command.

* * * * *